(12) United States Patent
Zhang et al.

(10) Patent No.: US 12,045,488 B2
(45) Date of Patent: Jul. 23, 2024

(54) DATA PROCESSING METHOD AND DEVICE AND ELECTRONIC APPARATUS

(71) Applicant: Nanjing SemiDrive Technology LTD., Nanjing (CN)

(72) Inventors: Lihang Zhang, Nanjing (CN); Qiang Zhang, Nanjing (CN); Yujing Qiu, Nanjing (CN)

(73) Assignee: Nanjing SemiDrive Technology LTD., Nanjing (CN)

( * ) Notice: Subject to any disclaimer, the term of this patent is extended or adjusted under 35 U.S.C. 154(b) by 43 days.

(21) Appl. No.: 17/745,008

(22) Filed: May 16, 2022

(65) Prior Publication Data
US 2022/0365695 A1 Nov. 17, 2022

(30) Foreign Application Priority Data
May 14, 2021 (CN) .......................... 202110524803.7

(51) Int. Cl.
*G06F 3/06* (2006.01)
(52) U.S. Cl.
CPC .......... *G06F 3/0644* (2013.01); *G06F 3/0604* (2013.01); *G06F 3/0655* (2013.01); *G06F 3/0679* (2013.01)
(58) Field of Classification Search
CPC .... G06F 3/0644; G06F 3/0604; G06F 3/0655; G06F 3/0679
See application file for complete search history.

(56) References Cited

U.S. PATENT DOCUMENTS

| | | | | |
|---|---|---|---|---|
| 2005/0081013 | A1* | 4/2005 | Pekny | G11C 5/025 711/173 |
| 2013/0125107 | A1* | 5/2013 | Bandakka | G06F 11/1433 717/171 |
| 2016/0089607 | A1* | 3/2016 | Ike | G07F 17/3211 463/29 |
| 2016/0092701 | A1* | 3/2016 | Shah | H04L 9/3247 713/189 |
| 2018/0349287 | A1* | 12/2018 | Kan | G06F 12/0246 |
| 2020/0034298 | A1* | 1/2020 | Benisty | G06F 12/0873 |

FOREIGN PATENT DOCUMENTS

| | | |
|---|---|---|
| CN | 103890688 A | 6/2014 |
| CN | 107111450 A | 8/2017 |
| CN | 108139977 A | 6/2018 |

* cited by examiner

*Primary Examiner* — Prasith Thammavong
(74) *Attorney, Agent, or Firm* — ANOVA LAW GROUP, PLLC

(57) ABSTRACT

A dynamic loading system of an off-chip non-volatile memory based on virtual mapping includes the off-chip non-volatile memory, an on-chip memory, an on-chip mapping device, a memory access controller, and an off-chip memory. The on-chip mapping device is configured to construct a mapping relationship between a logical partition and a physical partition of the on-chip memory. The memory access controller is configured to parse a memory access of a system into an access to the logical partition, configure a prediction algorithm of data loading, and send a memory loading request to the off-chip memory loading device. The off-chip memory loading device is configured to construct a mapping relationship between a program partition of the off-chip non-volatile memory and the physical partition of the on-chip memory.

9 Claims, 3 Drawing Sheets

DATA PROCESSING METHOD AND DEVICE AND ELECTRONIC APPARATUS

CROSS-REFERENCE TO RELATED APPLICATION

This application claims priority to Chinese Patent Application No. 202110524803.7, filed on May 14, 2021, the entire content of which is incorporated herein by reference.

TECHNICAL FIELD

The present disclosure generally relates to the integrated circuit technology field and, more particularly, to a highly reliable system on chip (SoC), and a dynamic loading system and method of an off-chip non-volatile memory in a microcontroller (MCU).

BACKGROUND

As the integration level of a high-reliability system-on-chip (SoC) and the microcontroller (MCU) is further improved, the requirement of the system for the capacity of the program area is significantly increased. Due to the limitation of the capacity of an on-chip non-volatile memory (Flash) of the SoC and the MCU, an off-chip non-volatile memory Flash may be expanded to solve the problem. However, due to the limitation of the speed of the off-chip Flash, a performance-sensitive program segment may be executed after being loaded on a reliable static memory (RAM) with a high speed in the SoC and the MCU.

In a conventional microcontroller system, considering system performance and safety, when the resource of the RAM of the SoC and the MCU is not enough to load all the performance-sensitive programs, the program in the off-chip Flash can be executed after being dynamically loaded in the RAM according to the requirements of system operations. Due to the capacity limitation, the space of an on-chip memory is often much smaller than the off-chip memory. Thus, the processor needs to dynamically guide an external program during the operation process in the on-chip memory space. However, the existing method of dynamically guiding the external program in the on-chip memory space has the following technology defects.

In the process of dynamically loading the program, the software execution is frequently interrupted by the program loading process. The execution efficiency and performance of the software are difficult to be ensured. Meanwhile, different external program segments are mapped to a same address segment in the on-chip memory of the processor, which increases the complexity of the software design.

SUMMARY

In order to solve the defects in the existing technology, the purpose of the present disclosure is to provide a dynamic loading system and method of an off-chip non-volatile memory based on virtual mapping. A program loading strategy of combining virtual mapping and prediction of an external Flash to an on-chip memory of a microcontroller with software control and a hardware loading program are used to perform automatic verification to simplify software design and reduce software load to improve operation efficiency and overall performance of the system.

Embodiments of the present disclosure provide a dynamic loading system of an off-chip non-volatile memory based on virtual mapping, including the off-chip non-volatile memory, an on-chip memory, an on-chip mapping device, a memory access controller, and an off-chip memory. The on-chip mapping device is configured to construct a mapping relationship between a logical partition and a physical partition of the on-chip memory. The memory access controller is configured to parse a memory access of a system into an access to the logical partition, configure a prediction algorithm of data loading, and send a memory loading request to the off-chip memory loading device. The off-chip memory loading device is configured to construct a mapping relationship between a program partition of the off-chip non-volatile memory and the physical partition of the on-chip memory.

Embodiments of the present disclosure provide a dynamic loading method of an off-chip non-volatile memory based on virtual mapping. The method includes performing partition on a memory, configuring a mapping relationship of a partition, generating a memory loading request by selecting a prediction algorithm, loading and verifying a program according to the memory loading request, and executing the program and generating a next memory loading request.

The dynamic loading system and method of the off-chip non-volatile memory based on the virtual mapping of the present disclosure have the following technical effects.

The software design is simplified by virtually mapping the external Flash to the on-chip memory of MCU.

The operation efficiency and performance of the system are improved by using the program loading strategy of combining the prediction and the software control.

The software load is reduced, and the overall performance of the system is improved by using the automatic verification method of the hardware loading program.

Other features and advantages of the present disclosure are described in the description below. Some of the features and advantages become apparent in the description or may be learned by implementing the disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION OF THE EMBODIMENTS

Embodiments of the present disclosure are described below in connection with the accompanying drawings. The embodiments described here are merely used for illustration and explanation and are not intended to limit the present disclosure.

In a dynamic loading system and method of off-chip non-volatile memory based on virtual mapping of the present disclosure, dynamic loading may need to be achieved, and effectiveness of a loading content in a loading process may need to be detected in real-time. Thus, in the present disclosure, an external Flash content storage format may be adopted.

The stored content of the external FLASH may include the following formats.

1. Verification partition. The verification partition may store partition verification information of other partitions of the external Flash and the verification partition. An application may appropriately select a verification algorithm based on a security target of the application, a characteristic of an application scenario, and the system cost. Algorithms that are commonly used may include cyclic redundancy check (CRC), error correcting codes (ECC), CheckSum, Hash, etc.
2. Configuration partition. The configuration partition may be configured to store a mapping relationship between an external memory and an on-chip memory partition, and a prediction configuration of an access controller.
3. Program partition. A plurality (N) of program partitions may be individually configured in size.

Figure 1:
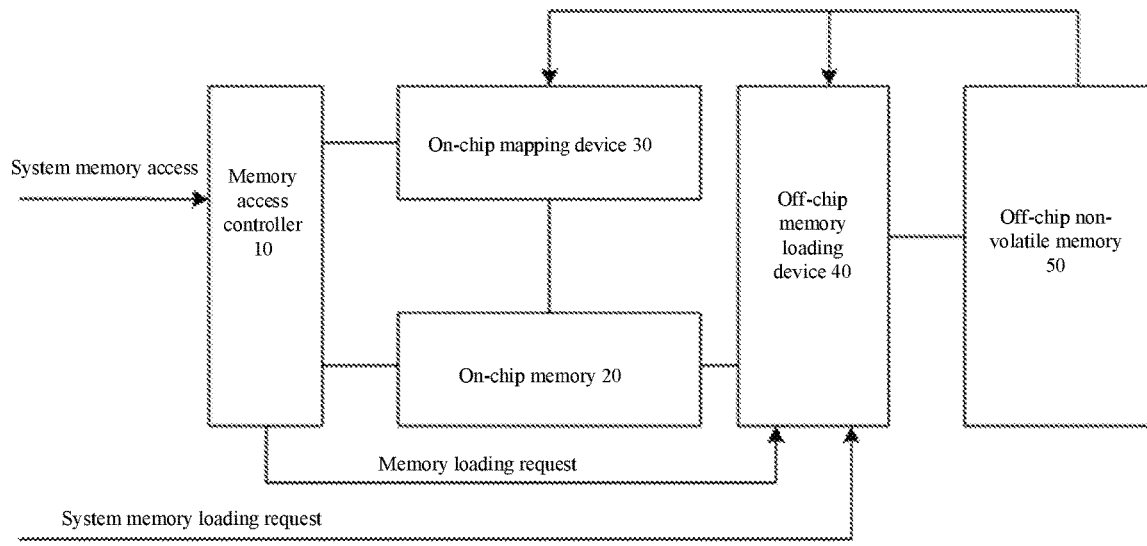
FIG. 1 illustrates a schematic structural diagram of a dynamic loading system of an off-chip non-volatile memory based on virtual mapping according to some embodiments of the present disclosure.

FIG. 1 illustrates a schematic structural diagram of a dynamic loading system of an off-chip non-volatile memory based on virtual mapping according to some embodiments of the present disclosure. As shown in FIG. 1, the dynamic loading system of the off-chip non-volatile memory based on the virtual mapping of the present disclosure includes a memory access controller 10, an on-chip memory 20, an on-chip mapping device 30, an off-chip storage loading device 40, and an off-chip non-volatile memory 50.

The memory access controller 10 may be configured to parse a system memory access into an access to a logical partition of the on-chip mapping device 30, predict a physical partition of the on-chip memory 20 that is to be accessed, and send a memory loading request to the off-chip storage loading device 40 if the physical partition is not loaded.

The on-chip memory 20 may be a system-on-chip (SoC) or an internal static memory (SRAM) of a microcontroller (MCU) and be divided into a plurality (M) of physical partitions that can be configured individually in size according to the requirements of the application.

The on-chip mapping device 30 may be configured to perform configuration on a mapping relationship between a logical partition of the on-chip mapping device 30 and a physical partition of the on-chip memory 20 and convert a logical address access of the system into a physical address access to the on-chip memory 20.

The off-chip storage loading device 40 may be configured to perform configuration on a mapping relationship between a program partition of the off-chip non-volatile memory 50 and a physical partition of the on-chip memory 20, receive the memory loading request directly sent by the memory access controller 10 and/or the system and copy the external program partition of the off-chip non-volatile memory 50 to the corresponding physical partition of the on-chip memory 20.

The off-chip non-volatile memory 50 may be used to store a program, partition verification information, a partition mapping relationship, and prediction configuration of the memory access controller 10.

Figure 2:
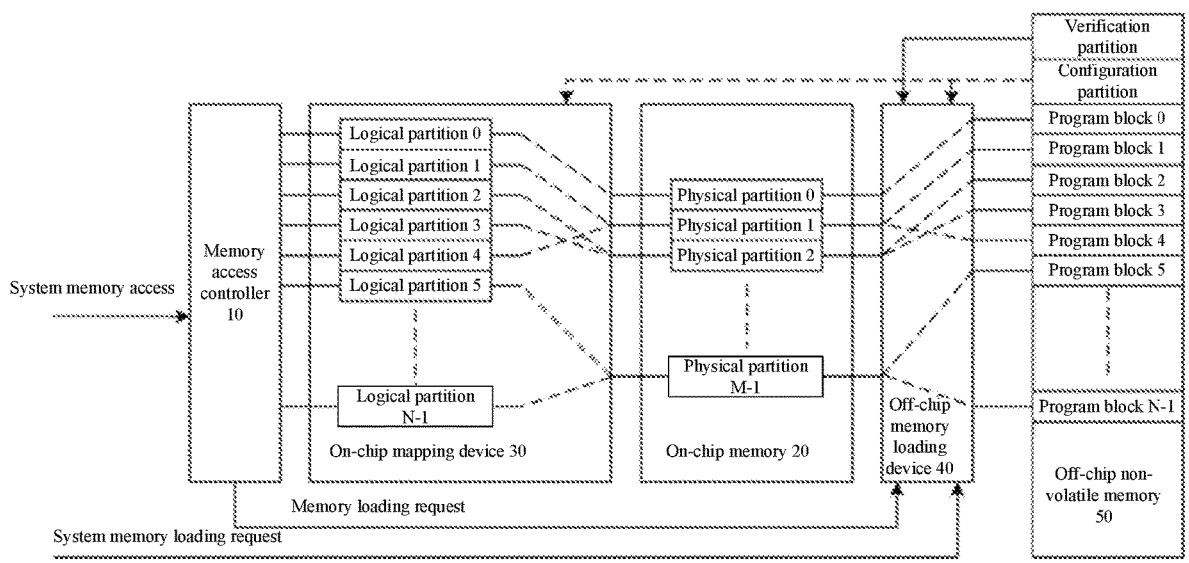
FIG. 2 illustrates a schematic structural diagram of another dynamic loading system of an off-chip non-volatile memory based on virtual mapping according to some embodiments of the present disclosure.

FIG. 2 illustrates a schematic structural diagram of another dynamic loading system of an off-chip non-volatile memory based on virtual mapping according to some embodiments of the present disclosure. As shown in FIG. 2, in the dynamic loading system of the off-chip non-volatile memory based on the virtual mapping, an off-chip non-volatile memory 50 includes a verification partition, a configuration partition, and a program partition.

In embodiments of the present disclosure, the verification partition may be used to store verification information of partitions in the off-chip non-volatile memory 50, including verification values of the program partition, the configuration partition, and the verification partition. The application may select a verification algorithm based on a security target of the application, a characteristic of an application scenario, and system cost. Algorithms that are commonly used may include cyclic redundancy check (CRC), error correcting codes (ECC), CheckSum, Hash, etc.

In embodiments of the present disclosure, the configuration partition may be configured to store a mapping relationship between a program partition of an off-chip non-volatile memory 50 and a physical partition of an on-chip memory 20, a mapping relationship between a logical partition of the on-chip mapping device 30 and the physical partition of the on-chip memory 20, and prediction configuration of a memory access controller 10. In a system startup process, the content of the configuration partition may be configured in the memory access controller 10, the on-chip mapping device 30, and the off-chip storage loading device 40.

In embodiments of the present disclosure, the program partition may include a plurality (N) of program blocks that can be configured in size and used to store an application program.

The memory access controller 10 may be responsible for the configuration related to data loading and prediction and be configured to parse a system memory access into an access to the logical partition. In embodiments of the present disclosure, division of the logical partitions of the on-chip mapping device 30 and sizes of the logical partitions may be the same as the program blocks of the program partition of the off-chip storage loading device 40. The memory access controller 10 may be further configured to monitor a single or a plurality of host accesses, predict the physical partition of the in-chip memory 20 that is to be accessed, and send the memory loading request to the off-chip storage loading device 40 if the physical partition is not loaded.

In embodiments of the present disclosure, a prediction algorithm for predicting the physical partition of the on-chip memory 20 that is to be accessed may be configured as follows.

a. No prediction. The loading is performed when the physical partition that is not loaded is accessed.
b. Single point prediction. One or more partition access requests are generated when a certain pre-configured address is accessed.
c. Multi-point prediction. One or more partition access requests are generated when a plurality of pre-configured addresses is accessed according to a certain order.

The on-chip mapping device 30 may include a plurality (N) of logical partitions. The on-chip mapping device 30 may be configured to convert an access to a logical address of the system into an access to a particular physical partition of the on-chip memory 20, perform conversion on the system from accessing the logical address to the physical address of the on-chip memory 20, monitor state information of the physical partitions of the on-chip memory 20, stop the system from accessing the physical partition when the state of the physical partition that is accessed represents that the loading is not completed, and restart the access of the system to the physical partition after the physical partition that is accessed is loaded.

The off-chip storage loading device 40 may be configured to construct a mapping relationship between a program partition of the off-chip non-volatile memory 50 and a physical partition of the on-chip memory 20.

In embodiments of the present disclosure, the off-chip storage loading device 40 may be configured to process the memory loading request directly sent by the memory access controller 10 and/or the system, and start the loading process if the external program partition that is requested to be loaded is not loaded into the on-chip memory 20.

In embodiments of the present disclosure, the off-chip storage loading device 40 may be configured to copy the external program partition to the corresponding physical partition of the on-chip memory 20 and calculate the verification value of the copied content according to the verification requirement. The off-chip storage loading device 40 may be further configured to compare the calculated verification value with a corresponding value in the verification partition after the external program partition is copied to the corresponding physical partition of the on-chip memory 20, if the verification passes, modify the state of the physical partition to be loading completed, and if the verification fails, generate an interrupt.

Figure 3:
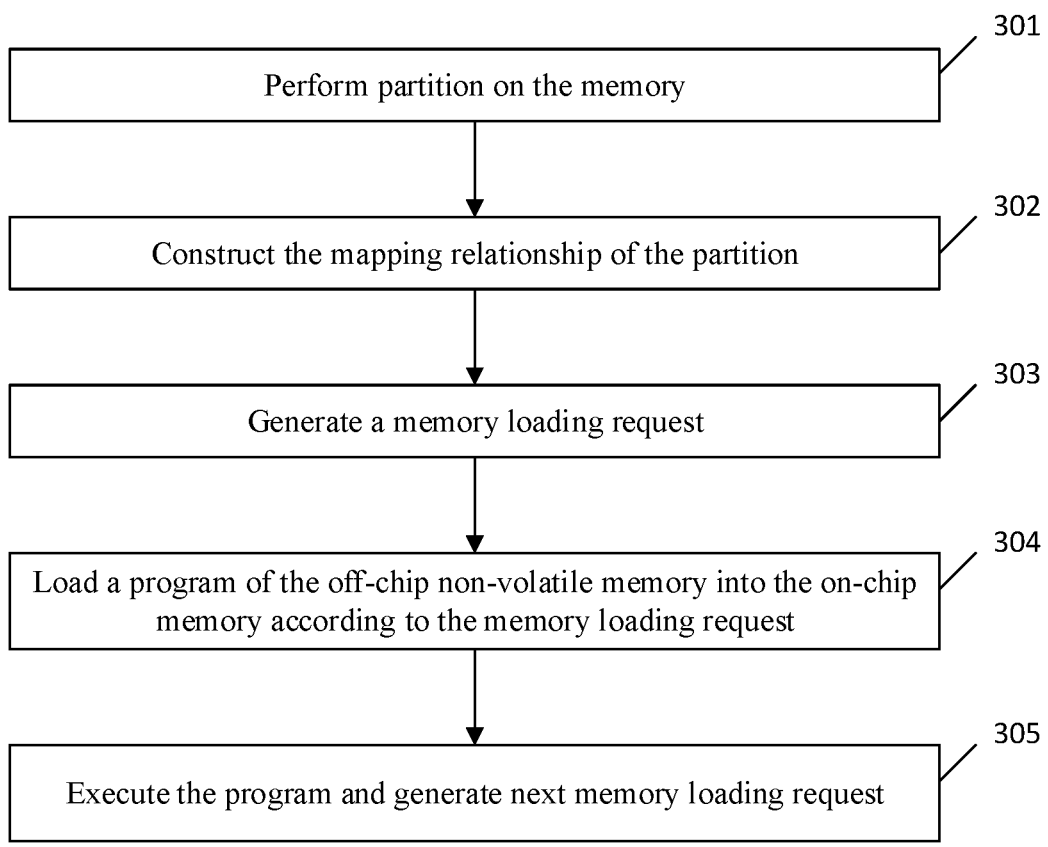
FIG. 3 illustrates a schematic flowchart of a dynamic loading method of an off-chip non-volatile memory based on virtual mapping.

FIG. 3 illustrates a schematic flowchart of a dynamic loading method of an off-chip non-volatile memory based on virtual mapping according to embodiments of the present disclosure. As shown in FIG. 3, the dynamic loading method of the off-chip non-volatile memory based on the virtual mapping according to embodiments of the present disclosure is described in detail below.

First, at 301, partition is performed on the memory.

In embodiments of the present disclosure, according to actual needs, the on-chip memory 20 may be divided into a plurality (M) of physical partitions. The off-chip storage loading device 40 may be divided into a verification partition, a configuration partition, and a program partition.

The verification partition may be configured to store the partition verification information of other partitions and the verification partition.

The configuration partition may be configured to store the mapping relationship between the program partition of the off-chip non-volatile memory 50 and the physical partition of the on-chip memory 20, the mapping relationship between the logical partition of the on-chip mapping device 30 and the physical partition of the on-chip memory 20, and the prediction configuration of the memory access controller 10.

The program partition may include a plurality (N) of program blocks that can be individually configured in size.

At 302, the mapping relationship of the partition is configured.

In embodiments of the present disclosure, the on-chip mapping device 30 may be configured to construct the mapping relationship between the logical partition and the physical partition of the on-chip memory. The off-chip storage loading device 40 may be configured to construct the mapping relationship between the program partition of the off-chip non-volatile memory 50 and the physical partition of the on-chip memory 20.

At 303, a memory loading request is generated.

In embodiments of the present disclosure, the memory access controller 10 may be configured to monitor a single or a plurality of accesses of the host in the system, predict the physical partition of the on-chip memory 20 that is to be accessed, and send a memory loading request to the off-chip storage loading device 40 if the physical partition is not loaded.

In embodiments of the present disclosure, the memory loading request may include a selected prediction algorithm and setting an address of the prediction algorithm to an address of an end of each logical partition.

At 304, a program of the off-chip non-volatile memory is loaded into the on-chip memory according to the memory loading request.

In embodiments of the present disclosure, the off-chip storage loading device 40 may be configured to load the program partition of the off-chip non-volatile memory into the physical partition of the on-chip memory 20 according to the memory loading request.

In embodiments of the present disclosure, the off-chip storage loading device 40 may be configured to copy the external program partition to the corresponding physical partition of the on-chip memory 20 and calculate the verification value of the copied content according to the verification requirement. The off-chip storage loading device 40 may be further configured to compare the calculated verification value with the corresponding value in the verification partition after the external program partition is copied to the corresponding physical partition of the on-chip memory 20. The off-chip storage loading device 40 may be further configured to modify the state of the partition to be loading completed if the verification passes and generate an interrupt if the verification fails.

At 305, the program is executed, and the memory loading request is generated.

In embodiments of the present disclosure, the workflow of the dynamic loading of the off-chip non-volatile memory based on the virtual mapping is described below.

Figure 4:
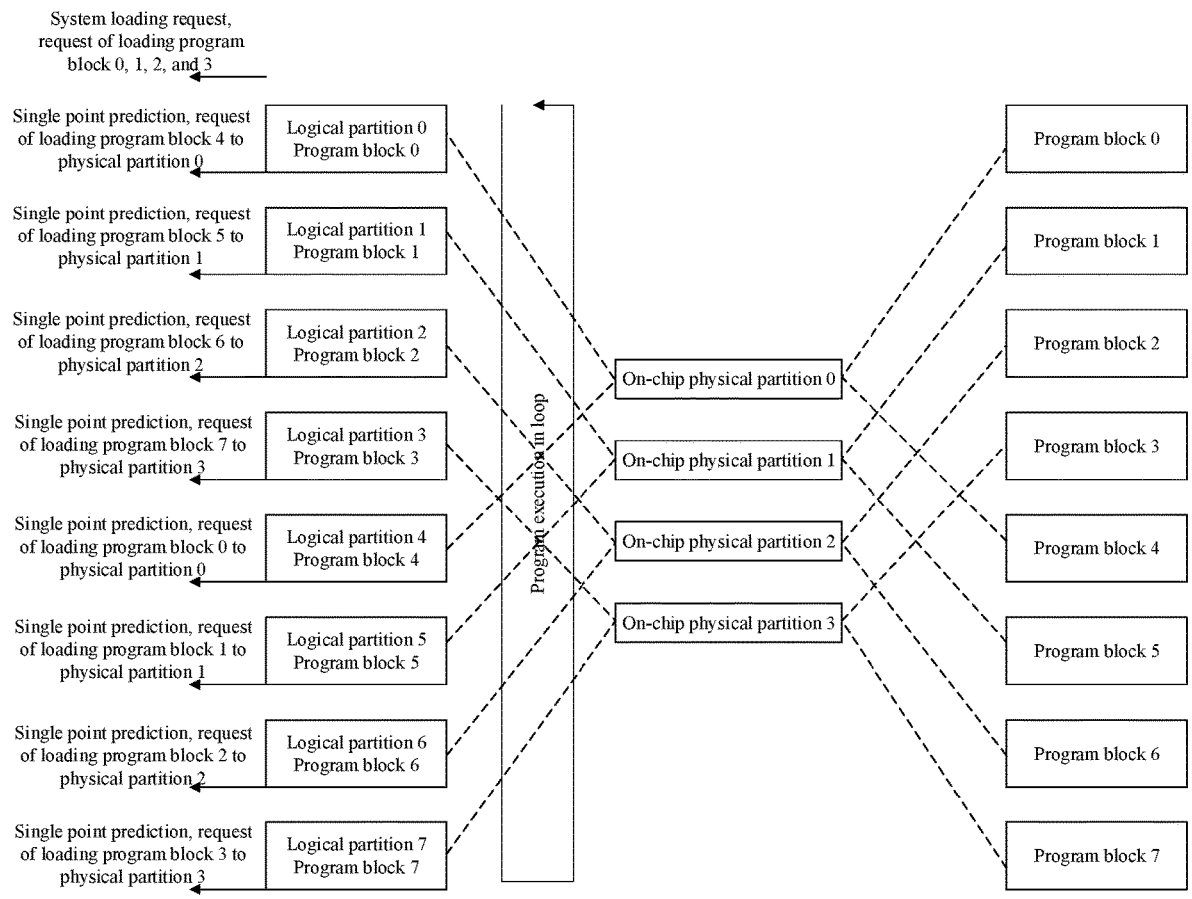
FIG. 4 illustrates a schematic flowchart of a dynamic loading method of an off-chip non-volatile memory based on virtual mapping according to some embodiments of the present disclosure.

As shown in FIG. 4, the on-chip memory 20 is divided into four physical partitions, including, physical partition 0 to physical partition 3. The logical partition of the mapping device is divided into eight partitions, including logical partition 0 to logical partition 7. The program partition of the off-chip non-volatile memory 50 is divided into 7 program blocks, including program block 0 to program block 7.

The on-chip mapping device 30 may be configured to map logical partition 0 and logical partition 4 to physical partition 0 of the on-chip memory 20, logical partition 1 and logical partition 5 to physical partition 1 of the on-chip memory 20, logical partition 2 and logical partition 6 to physical partition 2 of the on-chip memory 20, and logical partition 3 and logical partition 7 to physical partition 3 of the on-chip memory 20.

Assume that the program may be executed from logical partition 0 to the last logical partition in sequence and then back to logical partition 0 to perform the execution in a loop. A single point prediction mode may be selected to generate a loading request from the off-chip non-volatile memory 50 to the corresponding physical partition of the on-chip memory 20 according to the characteristic of the program execution. In this example, the address of the single point prediction may be set to the address of the end of each logical partition.

Before the program corresponding to logical partition 0 is executed, program blocks 0, 1, 2, and 3 may be requested to be loaded to on-chip physical partitions 0, 1, 2, and 3 through a manner of the system memory loading request.

When logic partition 0 is loaded, the system may start to execute the program in logical partition 0. When the system executes the program to the end of logical partition 0, a request of loading program block 4 into on-chip physical partition 0 may be generated. Since the data that is requested to be loaded is the data that needs to be used by the system after logical partitions 1, 2, and 3 are executed, the system loading device may thus have sufficient time to load and verify the content of program block 4. Therefore, system performance loss due to loading may be avoided.

A corresponding loading request may be generated at the end of each logical partition, which is cycled in the loop.

In the present example, the single-point prediction mode may be selected for the characteristic of sequentially executing the program. In some embodiments, a multi-point prediction mode may also be selected according to a program of a jump branch structure to effectively determine a sequence, in which the system reads data.

Those of ordinary skill in the art should understand that the above description describes some embodiments of the present disclosure and is not intended to limit the present disclosure. Although the present disclosure is described in detail with reference to the above embodiments, for those skilled in the art, modification may be still made to the technical solutions described in embodiments of the present disclosure, or equivalent replacement may be made to some of the technical features. Any modifications, equivalent replacements, and improvements made within the spirit and principle of the present disclosure should be within the scope of the present disclosure.

What is claimed is:

1. A dynamic loading system of an off-chip non-volatile memory based on virtual mapping comprising:
    the off-chip non-volatile memory;
    an on-chip memory;
    an on-chip mapping device configured to construct a mapping relationship between a logical partition and a physical partition of the on-chip memory;
    a memory access controller configured to parse a memory access of a system into an access to the logical partition, configure a prediction algorithm of data loading, and send a memory loading request to an off-chip memory loading device; and
    the off-chip memory loading device configured to construct a mapping relationship between a program partition of the off-chip non-volatile memory and the physical partition of the on-chip memory, the program partition including a plurality of program blocks that are individually configured in size and configured to store an application program.

2. The dynamic loading system according to claim 1, wherein:
    the on-chip memory is an on-chip static memory divided into a plurality of physical partitions.

3. The dynamic loading system according to claim 1, wherein the off-chip non-volatile memory includes:
    a verification partition configured to store verification information;
    a configuration partition configured to store the mapping relationship between the program partition of the off-chip non-volatile memory and the physical partition of the on-chip memory and a prediction configuration of the memory access controller; and
    the program partition.

4. The dynamic loading system according to claim 1, wherein:
    the memory access controller configures the prediction algorithm according to an access of the system and predicts a logical partition that is to be accessed; and
    the prediction algorithm includes:

no prediction, loading a program in response to a partition that is not loaded being accessed;
a single point prediction, generating one or more partition loading requests in response to a certain pre-configured address being accessed; and
a multi-point prediction, generating one or more partition loading requests in response to a plurality of pre-configured addresses being accessed according to a certain sequence.

5. The dynamic loading system of claim 1, wherein the on-chip mapping device is configured to convert a logical address accessed by the system into a physical address of the on-chip memory and monitor state information of each physical partition of the on-chip memory.

6. The dynamic loading system of claim 1, wherein the off-chip memory loading device is configured to:
    load the program partition of the off-chip volatile memory to the physical partition of the on-chip memory according to memory loading requests directly sent by the memory access controller and the system;
    in response to a program block that is requested to be loaded being not loaded in the on-chip memory, start a loading process;
    copy the program block to a corresponding physical partition of the on-chip memory and calculate a verification value of a copied content according to a verification need;
    compare the calculated verification value with a corresponding value in a verification partition after the program block is copied:
        in response to passing verification, change a state of the program block to be loading completed; and
        in response to failing the verification, generate an interrupt.

7. A dynamic loading method of an off-chip non-volatile memory based on virtual mapping comprising:
    dividing an on-chip memory into a plurality of physical partitions;
    dividing the off-chip non-volatile memory into:
        a verification partition configured to store verification information;
        a configuration partition configured to store a mapping relationship between a program partition of the off-chip non-volatile memory and a physical partition of the on-chip memory and a prediction configuration of a memory access controller; and
        the program partition including a plurality of program blocks that are individually configured in size and configured to store an application program;
    configuring mapping relationships of various partitions;
    generating a memory loading request by selecting a prediction algorithm;
    loading and verifying a program according to the memory loading request; and
    executing the program and generating a next memory loading request.

8. The dynamic loading method according to claim 7, wherein configuring the mapping relationships of the various partitions further includes:
    configuring a mapping relationship between a logical partition and a physical partition of an on-chip memory by an on-chip mapping device; and
    configuring a mapping relationship between a program partition of the off-chip non-volatile memory and the physical partition of the on-chip memory by an off-chip memory loading device.

9. The dynamic loading method according to claim 7, wherein loading and verifying the program according to the memory loading request includes:
- copying a program block to a corresponding physical partition of an on-chip memory according to the memory loading request and a mapping relationship between a program partition of the off-chip non-volatile memory and the physical partition of the on-chip memory and calculating a verification value of a copied content according to a verification need;
- comparing the calculated verification value with a corresponding value in a verification partition after the program block is copied:
  - in response to passing verification, changing a state of the program block to be loading completed; and
  - in response to failing the verification, generating an interrupt.

* * * * *